(12) United States Patent
Brands et al.

(10) Patent No.: US 11,871,777 B2
(45) Date of Patent: Jan. 16, 2024

(54) MULTI-TEXTURED GRAIN- OR LEGUME-BASED BAKED SNACK

(71) Applicant: Intercontinental Great Brands LLC, East Hanover, NJ (US)

(72) Inventors: Daphne Brands, East Hanover, NJ (US); Shelly Renken, East Hanover, NJ (US); Vani Vemulapalli, East Hanover, NJ (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 135 days.

(21) Appl. No.: 16/931,244

(22) Filed: Jul. 16, 2020

(65) Prior Publication Data

US 2022/0015400 A1 Jan. 20, 2022

(51) Int. Cl.
*A23L 7/126* (2016.01)
*A23L 29/30* (2016.01)
*A23L 29/212* (2016.01)

(52) U.S. Cl.
CPC .............. *A23L 7/126* (2016.08); *A23L 29/212* (2016.08); *A23L 29/30* (2016.08)

(58) Field of Classification Search
CPC ......... A23L 7/126; A23L 29/30; A23L 29/212
See application file for complete search history.

(56) References Cited

U.S. PATENT DOCUMENTS

| | | |
|---|---|---|
| 3,656,966 A | 4/1972 | Ball |
| 4,246,293 A | 1/1981 | Larson |
| 4,455,333 A | 6/1984 | Hong |
| 4,503,080 A | 3/1985 | Brabbs |
| 4,902,528 A * | 2/1990 | Groesbeck ............... A23L 7/196 426/462 |
| 5,110,613 A | 5/1992 | Brown |
| 5,137,745 A | 8/1992 | Zukerman |
| 5,366,749 A | 11/1994 | Frazee |
| 5,817,355 A | 10/1998 | Zukerman |
| 6,572,910 B2 | 6/2003 | Lanner |
| 7,416,755 B2 | 8/2008 | Gorski |
| 7,829,128 B2 | 11/2010 | Karwowski |
| 7,947,320 B2 | 5/2011 | Faa |
| 8,039,037 B2 | 10/2011 | Whitham |
| 8,277,865 B2 | 10/2012 | Bunke |
| 8,808,785 B1 | 8/2014 | Nouri Esfandiari |
| 9,861,106 B2 | 1/2018 | Waldner |
| 2003/0012860 A1* | 1/2003 | Zukerman ............... A23L 7/196 426/618 |
| 2004/0219280 A1* | 11/2004 | Green ..................... A23L 7/126 426/618 |
| 2007/0184160 A1 | 8/2007 | Josef |
| 2008/0206424 A1 | 8/2008 | Villagran |
| 2013/0251877 A1 | 9/2013 | Levin |
| 2015/0250190 A1* | 9/2015 | Vemulapalli ........... A21D 8/025 426/549 |
| 2016/0213035 A1 | 7/2016 | De Ruiter |

FOREIGN PATENT DOCUMENTS

EP          3571932 A1 * 11/2019  ............. A23K 40/10

OTHER PUBLICATIONS

Meera et al., "Varietal distinctness in physical and engineering properties of paddy and brown rice from southern India", 2019, Journal of Food Science and Technology, vol. 56(3), pp. 1473-1483 (Year: 2019).*
Mohoric, Ales, et al; "The effect of rice kernel microstructure on cooking behaviour: A combined μ-CT and MRI study"; Food Chemistry; vol. 115, Issue 4; Aug. 15, 2009; pp. 1491-1499 "Abstract Only" (2 pgs.).
Van Der Sman, R. G.M.; et al.; "Effects of filler ingredients on the structure and texture of starchy, extruded snacks"; Food Structure; vol. 18; https://www.elsevier.com/locate/foostr; 2018 (13 pgs.).
International Preliminary Report on Patentability, dated Jan. 17, 2023; International Application No. PCT/US2021/041011 (8 pgs.).

* cited by examiner

*Primary Examiner* — Jeffrey P Mornhinweg
*Assistant Examiner* — Kelly P Kershaw
(74) *Attorney, Agent, or Firm* — Fitch, Even, Tabin & Flannery LLP

(57) ABSTRACT

A multi-textured, baked, grain-based or legume-based snack includes a cooked grain or legume together with a crispy form of the grain and legume to create a baked multi-textured light snack having airy portion and crispy portions to provide consumers with a unique eating experience. Methods of preparing the snack are also provided.

15 Claims, 1 Drawing Sheet

MULTI-TEXTURED GRAIN- OR LEGUME-BASED BAKED SNACK

FIELD

This disclosure relates to multi-textured snacks, and more specifically, to multi-textured baked snacks that include both a cooked form of a grain or legume and a crispy form of that same grain or legume.

BACKGROUND

Baked crispy multi-textured snacks such as chips and crackers are becoming more and more popular with today's health-conscious consumers. Sometimes, the snacks include grain-based materials such as rice. Typically, such snacks are made from flour (e.g., rice flour) and flour based doughs. Unlike the products currently on the market, this invention leverages the temperature and moisture of the cooked grain to bind crispy form of the same grain to deliver a light multi-textured baked snack.

SUMMARY

The multi-textured, grain-based and/or legume-based baked snacks described herein are based on utilization of one type of grain or legume that is processed in multiple different ways (e.g., cooked form and crisp form), and combined with other ingredients to create a multi-textured, baked snack that is light, healthy, and is multi-textured (i.e., having airy portions and crispier portions) in order to create a unique eating experience for the consumers while not being too hard to chew for the consumers.

According to some embodiments, a method of preparing a multi-textured, grain-based, baked snack includes: (1) combining ingredients including a grain that is cooked, a crispy form of the grain, a pre-gelatinized starch, syrup, water, oil, and seasoning, and mixing the ingredients to form a agglomerated mixture, with at least 50 wt. % of the agglomerated mixture being made up by the cooked grain, the crispy form of the grain, and the seasoning; (2) sheeting the agglomerated mixture to form one or more sheets for baking; (3) baking the one or more sheets to a moisture level of about 2% to about 4% to form a baked product; and (4) breaking the baked product to form a plurality of pieces of the multi-textured, grain-based, baked snack.

In some embodiments, a multi-textured, grain-based, baked snack includes a grain that is cooked, a crispy form of the grain, a pre-gelatinized starch, syrup, water, oil, and seasoning, with at least 50 wt. % of the multi-textured, grain-based, baked snack being formed by the cooked grain, the crispy form of the grain, and the seasoning.

In some embodiments, an agglomerated mixture for preparing a multi-textured, grain-based, baked snack includes a grain that is cooked, a crispy form of the grain, a pre-gelatinized starch, syrup, water, oil, and seasoning, with at least 50 wt. % of the agglomerated mixture being formed by the cooked grain, the crispy form of the grain, and the seasoning.

DETAILED DESCRIPTION

Figure 1:
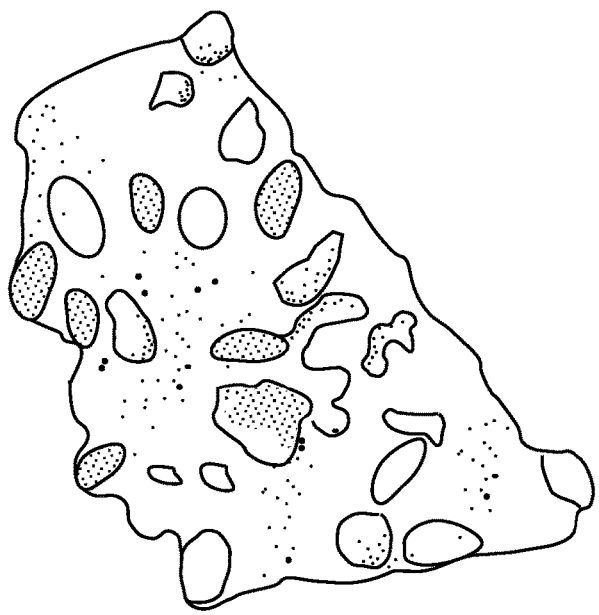
FIG. 1 is a top plan view of an exemplary multi-textured, grain-based, baked snack according to some embodiments.

Multi-textured, baked, grain-based or legume-based snacks described herein may be generally referred to as "grain barks," and generally include a cooked grain or legume, together with a crispy form of the grain or legume, to create a multi-textured, baked, light snack with a unique eating experience. Methods of preparing such grain-based or legume-based baked multi-textured snacks are also described.

In some embodiments, a method of preparing a multi-textured, grain-based, baked snack includes combining a cooked form of a grain or legume and a crispy form of the grain or legume with various ingredients to form an agglomerated mixture. In various implementation, different grains and legumes may be used in two different forms to create the multi-textured baked snacks referred to as barks herein. Some examples of grains or legumes suitable as ingredients for the agglomerated mixture include, but are not limited to: rice (white, brown, red, black, etc.), wild rice, quinoa, sorghum, amaranth, millet, wheat (including ancient wheat varieties like spelt, Khorasan, emmer, einkorn, faro), rye, barley, oat, corn, triticale, legumes (alfalfa, clover, beans, peas, chickpeas, lentils, lupins, mesquite, carob, soybeans, peanuts, etc.), or the like, and combinations thereof.

In some embodiments, the agglomerated mixture includes both a cooked form of a grain or legume (e.g., cooked rice, cooked quinoa, cooked sorghum, etc.) and a crispy version of the grain or legume (e.g., rice crisp, quinoa crisps, sorghum crisps, etc.) In one aspect, a method of producing the multi-textured, grain-based, baked snack includes combining a grain that is cooked and a crispy form of the same grain with other ingredients including a pre-gelatinized starch, syrup, water, oil, and seasoning.

Suitable syrups for use as ingredients of the multi-textured baked snacks described herein include but are not limited to: chicory root fiber syrups (inulin or fructo-oligosaccharides), tapioca syrup, glucose syrup, invert syrup, grain syrup (e.g. malted barley syrup, brown rice syrup, corn syrup, sorghum syrup, etc.), honey, molasses, tree sap syrups (e.g. maple syrup), apple cider syrup, vegetable syrups, fruit syrups, agave syrup, or the like, or combinations thereof. Without wishing to be limited by theory, the use of chicory root fiber syrups (inulin or fructo-oligosaccharides) enables the final baked snack product (i.e., bark) to have reduced sugar, reduced fat, and reduced caloric value, while providing great taste and texture attributes to the multi-textured baked snacks described herein.

Pre-gelatinized starches that are suitable for use as ingredients of the multi-textured baked snacks described herein include but are not limited to: grain based starch (e.g. corn starch, wheat starch, rice starch, etc.), tapioca or cassava starch, potato starch, or the like, or combinations thereof. Generally, pregelatinized starches retain most of the functional properties and viscosity of the original base material, and pre-gelatinization facilitates native and stabilized starches in forming a cold water paste. In other words, pre-gelatinized starches develop viscosity without the need for heat, such that pre-gelatinized starches do not need to be pre-cooked.

Suitable oils/fats for use as ingredients of the multi-textured baked snacks described herein include, but are not limited to: canola oil, safflower oil, sunflower oil, sesame oil, olive oil, avocado oil, coconut oil, soybean oil, palm oil, rice bran oil, wheat germ oil, grape seed oil, hemp oil, cottonseed oil, nut oils (peanut oil, almond oil, walnut oil, macadamia oil, etc.) or fats like cocoa butter, dairy butter. Emulsifiers such as lecithin, mono and diglycerides may be added with oil/fat. In addition, a wide variety of seasonings may be used as ingredients of the multi-textured baked bark snacks described herein, such that the bark snacks described herein may have a wide variety of flavors and complexities.

Examples of suitable seasonings that may be used as ingredients of the multi-textured baked bark snacks include, but are not limited to: salt, pepper, herbs/spices (e.g., dill, cilantro, parsley, thyme, oregano, rosemary, basil, bay leaves, sage, tarragon, marjoram, mint, curry, paprika, cardamom, cinnamon, cloves, cumin, nutmeg, saffron, sumac, star anise, turmeric, vanilla, coriander, etc.), vegetable/fruit/dairy/umami flavors (e.g., tomato, garlic, onion, celery, pepper, chili, ginger, chives, fenugreek, lemongrass, beet root, sweet potato, yeast extract, soy sauce, dairy powder, cheese powder, etc.) seeds (sunflower seeds, sesame seeds, flax seeds, hemp seeds, chia seeds, pumpkin seeds, poppy seeds, anise seed, fennel seed, caraway seeds, etc.), nuts (peanuts, almonds, walnuts, cashews, pistachios, macadamia, pine nuts, Brazil nut, hazelnut, pecan, coconut, etc.), or acid (lactic acid, vinegar powder, malic acid, citric acid, acetic acid, apple cider vinegar etc.) the like, or combinations thereof.

As mentioned above, in some embodiments, after the ingredients (e.g., a grain that is cooked, a crispy form of the same grain, a pre-gelatinized starch, a syrup, water, an oil, and seasoning) are combined, the ingredients are mixed to form an agglomerated mixture. The ingredients may be mixed at room temperature and do not require any temperature conditions that are higher or lower than typical room temperature. In some embodiments, the ingredients are mixed together until the resulting agglomerated mixture is well hydrated, but has a relatively low moisture level (e.g., 15-30 wt. %, or 15-25 wt. %) to prevent the grain inclusions (e.g., rice crisps) from becoming soggy and mushy, which would be undesirable.

Without being limited by theory, the present inventors unexpectedly discovered a low fat and low sugar binder that may be produced by combining a cooked grain or legume (e.g. cooked rice) with liquids (e.g., syrup, water, oil) and pre-gelatinized starch. In particular, while it is generally recognized that oil and syrup at low levels do not have strong binding properties, the present inventors unexpectedly found that combining liquids such as syrup, water, and/or oil with hot freshly cooked grain (e.g., rice) and pre-gelatinized starch (e.g., corn starch, tapioca starch, etc.) strengthens the binding capacity of the agglomerated mixture by forming a continuous gelatinized matrix, and that this binder forms an effective medium that permits effective incorporation of unusually high levels (e.g., above 50%) of low density grain-based or legume-based inclusions (e.g., rice crisps, chickpea crisps, etc.) and other inclusions (e.g., seasonings, herbs, vegetables, fruits, seeds, nuts, etc.). To that end, in some embodiments, the cooked grain, the crispy form of the grain, and the seasoning together make up at least 50 wt. % of the agglomerated mass, and in some aspects, about 55-56 wt. % of the agglomerated mixture.

In some embodiments, an exemplary agglomerated mixture suitable for producing the multi-textured baked snacks/barks described herein may include about 17-22 wt. % of the cooked grain, about 15-19 wt. % of the syrup, about 1-5 wt. % of the water, about 3-7 wt. % of the oil, about 17-22 wt. % of the pre-gelatinized starch, about 26-32 wt. % of the crispy form of the grain, and about 6-12 wt. % of the seasoning. In one aspect, an exemplary slurry suitable for producing the multi-textured baked snacks/barks described herein includes 19.5 wt. % cooked brown rice, 21 wt. % red rice crisps; 7 wt. % toasted brown rice crisps, 17 wt. % syrup, 19.5 wt. % pre-gelatinized starch, 5 wt. % oil, 3 wt. % water, and 8 wt. % seasoning. Another exemplary mixture may include ingredients such as: cooked *quinoa* 29.77%, tricolored (red, black, white) *quinoa* crisps 14.88%, pregelatinized corn starch 14.33%, pregelatinized tapioca starch 3.31%, brown rice flour 4.41%, spices 1.65%, butter milk and cheese powders 9.37%, tapioca syrup 60 DE 5.51%, fructo-oligosaccharides syrup 5.4%, water 5.51%, lecithin 0.35%, and canola oil 5.51%.

Without wishing to be limited by theory, the ability to create a low fat and low sugar binder by combining a cooked grain (e.g. cooked rice) with liquids (e.g., syrup, water, oil) and pre-gelatinized starch enables the baked snacks (i.e., "barks") described herein to be multi-textured (i.e., having airy portions and crispier portions) in order to create a unique eating experience for the consumers while not being too hard to chew for the consumers. In some aspects, the multi-textured baked snacks described herein include a combination of inclusions (e.g., cooked rice and rice crisps) having different densities and textures that complement one another to create a unique and enjoyable multi-textural and visual experience for the consumer.

For example, in some aspects, the ingredients of the multi-textured baked snacks described herein may be chosen specifically to create a visually appealing combination of colors. In one exemplary embodiment, the grain-based ingredients are: (1) cooked brown rice (which has a generally off-white color), (2) red rice crisps (which have a red color); and (3) brown rice crisps (which have a generally light brown color). In some embodiments, the overall visual appeal of the resulting multi-textured baked snacks may be enhanced not just by using different grain/legume ingredients of different colors, but also by adding additional inclusions (e.g., seasoning, veggies, fruits, etc.) that have varying colors that complement the colors of the grain/legume-based ingredients.

In some exemplary embodiments, the ingredients of an exemplary multi-textured baked snacks include a cooked grain (e.g., cooked brown rice) with a density of about 1100-1200 g/l and two different crispy forms of the grain, namely, toasted brown rice crisps with a density of about 250-350 g/l and red rice crisps having a density of about 700-800 g/l. While cooked rice and rice crisps are described herein as exemplary grain-based inclusions of some of the exemplary multi-textured baked snacks, it will be appreciated that various other grain-based or legume-based inclusions could be used to vary the level and type of inclusions and produce multi-textured baked snacks having a wide variety of textural combinations. Other than crisps, some grain/legume-based forms that may be usable as ingredients of the multi-textured baked snacks include, but are not limited to: extruded, sprouted, popped, gun puffed, pre-cooked and toasted crisps or the like.

After the ingredients are mixed to create an agglomerated mixture that has acceptable characteristics in terms of texture (e.g., a continuous matrix) and acceptable moisture levels (e.g., at or below about 20 wt. % such that the agglomerated mixture and/or the crispy inclusions are not too mushy), an exemplary method of producing the multi-textured baked snacks includes sheeting the agglomerated mixture in preparation for baking. In some embodiments, the agglomerated mixture (which may have the consistency of a dough) is sheeted to produce one or more sheets of a desired thickness.

In one embodiment, the sheeting may be achieved by passing the slurry between two rotating rollers that are spaced from each other at a distance designed to achieve the desired thickness of the resulting sheets (e.g., from about 2 to about 3 mm). The rolls may be set at room temperature, or may be cooled or heated relative to room temperature as needed. In one aspect, the rolls may have different temperatures relative to one each other. In some aspects, the sheeting step may be performed without rollers and may involve a rotary deposit process.

In some aspects, the agglomerated mixture is sheeted using a conventional bar process to avoid breaking the low-density inclusions (e.g., rice crisps) and preserve their integrity. In one embodiment, smooth rolls are utilized during the sheeting of the agglomerated mixture to prevent inclusions such as rice crisps from being crushed.

After the ingredient mixture is formed into one or more sheets of suitable thickness, the next step of the method of making the multi-textured snacks is baking the sheet(s), which may be placed on baking tray(s), in an oven to form a baked product. In some embodiments, the sheet(s) are baked in a conventional oven at a temperature of about 115° C.-160° C. for about 18-22 minutes until a crispy baked product having a moisture level of about 2-5% is formed. It will be appreciated that, in some embodiments, the ingredient agglomerated mixture is heat-treated using a different process (e.g., high temperature convection drying, vacuum drying, microwave heating, etc.).

Figure 2:
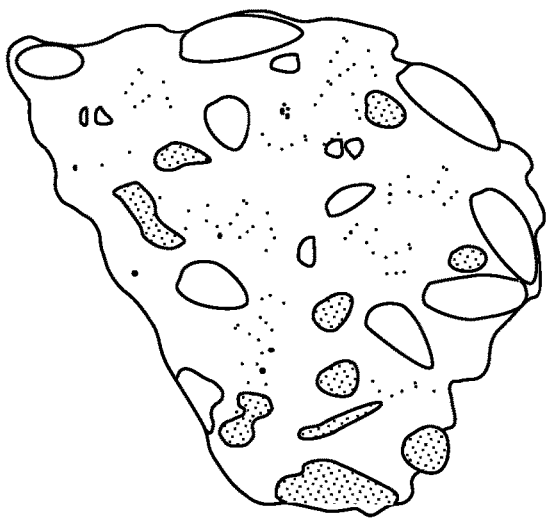
FIG. 2 is a top plan view of another exemplary multi-textured, grain-based, baked snack according to some embodiments.
Figure 3:
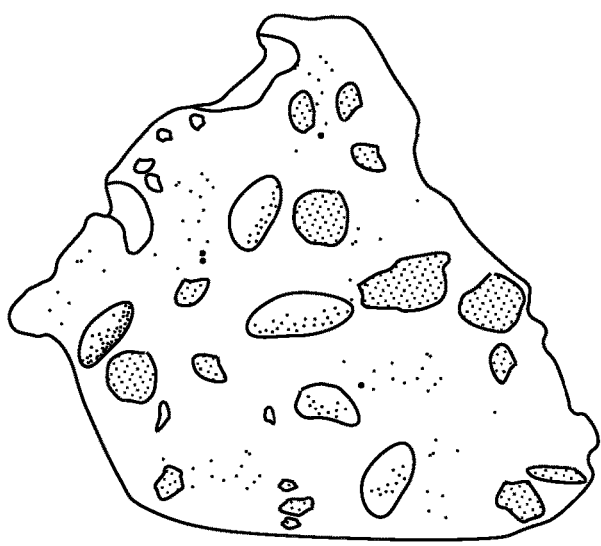
FIG. 3 is a top plan view of yet another exemplary multi-textured, grain-based, baked snack according to some embodiments.
Figure 4:
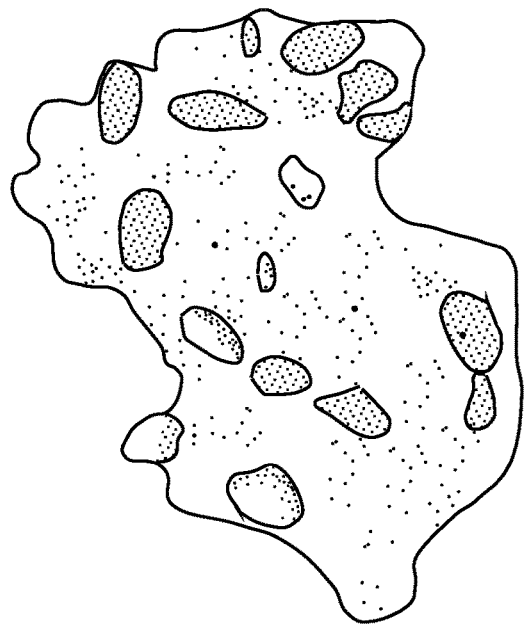
FIG. 4 is a top plan view of still another exemplary multi-textured, grain-based, baked snack according to some embodiments.

In some embodiments, after the baking step is complete, the baked product (which is still in a form of a continuous sheet or sheets) is cooled to room temperature (e.g., about 68° F.), or to a temperature that is below room temperature. After the baked product cools, the baked product is then transformed into the final product (i.e., the multi-textured baked snack or bark) by breaking the continuous baked sheet into a plurality of pieces of the multi-textured baked snack. The final shape of a piece of this snack can be unique and the snack pieces may have different shape, size, and inclusion location variations, and may be broken into irregular pieces of various sizes. Some exemplary multi-textured, grain-based baked snacks of different shapes and sizes are shown in FIGS. 1-4. In some implementations, breaking rolls are used to break the sheet into pieces while being configured at settings that do not crush or damage the inclusions (e.g., rice crisps). In another example the baked product could be cut into a bar shape. Due to the variations in the number and locations of inclusions in the multi-textured baked snacks (see, e.g., FIGS. 1-4), the cross-section and overall texture of the resulting multi-textured grain-based snacks may vary across their surface, potentially giving the consumer a different textural experience in every bite of the multi-textured baked snacks, which may make the snacks more desirable by consumers.

In some embodiments, the individual pieces of the multi-textured baked snack are generally triangular overall and are dimensioned to have a thickness of about 2 to about 3 mm and varying sizes of length and width. In some aspects, the individual pieces of the multi-textured baked snack that represent the final product of the above-described process have a density of less than about 650 g/l, for example, between about 500 g/l and 600 g/l, resulting in a final product that is not too hard for the consumers to chew.

As described herein, the use of a low fat and low sugar binder by combining a cooked grain (e.g. cooked rice) instead of a grain flour with a crispy form of that grain, as well as with liquids (e.g., syrup, water, oil) and pre-gelatinized starch, enables the baked snacks (i.e., "barks") described herein to be multi-textural to create a unique and enjoyable eating experience for the consumers while not being hard to chew for the consumers.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

We claim:

1. A method of preparing a multi-textured, grain-based, baked snack that includes two different forms of a grain, the method comprising:

cooking the grain to obtain a hot, cooked form of the grain, wherein the hot, cooked form of the grain is not a hot, cooked flour made from the grain;

combining ingredients including the hot, cooked form of the grain, a dried crispy form of the grain, a pre-gelatinized starch, syrup, water, oil, and seasoning, mixing the ingredients to form an agglomerated mixture in which the hot, cooked form of the grain forms at least a part of the continuous gelatinized matrix, wherein the agglomerated mixture comprises about 17-22 wt. % of the hot, cooked form of the grain, about 15-19 wt. % of the syrup, about 1-5 wt. % of the water, about 3-7 wt. % of the oil, about 17-22 wt. % of the pre-gelatinized starch, about 26-32 wt. % of the dried crispy form of the grain, and about 6-12 wt. % of the seasoning;

sheeting the agglomerated mixture to form at least one sheet for baking;

baking the at least one sheet to a moisture level of about 2% to about 5% to form a baked product; and breaking the baked product to form a plurality of pieces of the multi-textured, grain-based snack.

2. The method of claim 1, wherein the grain is selected from a group consisting of: rice, quinoa, sorghum, amaranth, millet, wheat, rye, barley, oat, corn, triticale, legumes, and combinations thereof.

3. The method of claim 2, wherein the dried crispy form of the grain comprises rice crisps.

4. The method of claim 1, wherein the syrup comprises one or more chicory root fiber syrups.

5. The method of claim 1, wherein the agglomerated mixture has a moisture level of about 15 wt. % to about 30 wt. %.

6. The method of claim 1, wherein the at least one sheet has a thickness of about 2 to about 3 mm.

7. The method of claim 1, wherein the multi-textured, grain-based snack has an overall density of less than 650 g/l.

8. A method of preparing a multi-textured, grain-based, baked snack that includes two different forms of a grain, the method comprising:

cooking the grain to obtain a hot, cooked form of the grain, wherein the hot, cooked form of the grain is not a hot, cooked flour made from the grain;

combining ingredients including the hot, cooked form of the grain, a dried crispy form of the grain, a pre-gelatinized starch, syrup, water, oil, and seasoning;

wherein the hot, cooked form of the grain has a density of about 1100-1200 g/l, and wherein the dried crispy form of the grain has a density of about 300-750 g/l mixing the ingredients to form an agglomerated mixture in which the hot, cooked form of the grain forms at least a part of a continuous gelatinized matrix, wherein the hot, cooked form of the grain, the dried crispy form of the grain, and the seasoning comprise at least 50 wt. % of the agglomerated mixture;

sheeting the agglomerated mixture to form at least one sheet for baking;

baking the at least one sheet to a moisture level of about 2% to about 5% to form a baked product and breaking the baked product to form a plurality of pieces of the multi-textured, grain-based snack.

9. The method of claim 1, wherein the baking includes baking the at least one sheet at a temperature of about 115° C. to about 160° C. for about 18 to about 22 minutes.

10. An agglomerated mixture for preparing a multi-textured, grain-based, baked snack that includes two different forms of a grain, the agglomerated mixture comprising a hot, cooked form of the grain, a dried crispy form of the grain, a pre-gelatinized starch, syrup, water, oil, and seasoning, wherein the hot, cooked form of the grain is not a hot, cooked flour made from the grain, wherein the agglomerated mixture includes a continuous gelatinized matrix at least a part of which is formed by which the hot, cooked form of the grain, and wherein the agglomerated mixture comprises about 17-22 wt. % of the hot, cooked form of the grain, about 15-19 wt. % of the syrup, about 1-5 wt. % of the water, about 3-7 wt. % of the oil, about 17-22 wt. % of the pre-gelatinized starch, about 26-32 wt. % of the dried crispy form of the grain, and about 6-12 wt. % of the seasoning.

11. The agglomerated mixture of claim 10, wherein the grain is selected from a group consisting of: rice, quinoa, sorghum, amaranth, millet, wheat, rye, barley, oat, corn, triticale, legumes, and combinations thereof.

12. The agglomerated mixture of claim 10, wherein the dried crispy form of the grain comprises rice crisps.

13. The agglomerated mixture of claim 10, wherein the syrup comprises one or more chicory root fiber syrups.

14. The agglomerated mixture of claim 10, wherein the agglomerated mixture has a moisture level of about 15 wt. % to about 30 wt. %.

15. An agglomerated mixture for preparing a multi-textured, grain-based, baked snack that includes two different forms of a grain, the agglomerated mixture comprising a hot, cooked form of the grain, a dried crispy form of the grain, a pre-gelatinized starch, syrup, water, oil, and seasoning, wherein the hot, cooked form of the grain is not a hot, cooked flour made from the grain, wherein the agglomerated mixture includes a continuous gelatinized matrix at least a part of which is formed by the hot, cooked form of the grain, and wherein the hot, cooked form of the grain, the dried crispy form of the grain, and the seasoning comprise at least 50wt. % of the agglomerated mixture, wherein the hot, cooked form of the grain has a density of about 1100-1200 g/l, and wherein the dried crispy form of the grain has a density of about 300-750 g/l.

* * * * *